United States Patent
Hirose et al.

(10) Patent No.: US 12,270,912 B2
(45) Date of Patent: Apr. 8, 2025

(54) STRUCTURE FOR MOUNTING NEAR INFRARED SENSOR AND SENSOR COVER TO VEHICLE

(71) Applicant: TOYODA GOSEI CO., LTD., Kiyosu (JP)

(72) Inventors: Akihiro Hirose, Kiyosu (JP); Koji Okumura, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 891 days.

(21) Appl. No.: 17/435,140

(22) PCT Filed: Mar. 13, 2020

(86) PCT No.: PCT/JP2020/011080
§ 371 (c)(1),
(2) Date: Aug. 31, 2021

(87) PCT Pub. No.: WO2020/195949
PCT Pub. Date: Oct. 1, 2020

(65) Prior Publication Data
US 2022/0137229 A1    May 5, 2022

(30) Foreign Application Priority Data

Mar. 27, 2019 (JP) .................. 2019-060969
Mar. 27, 2019 (JP) .................. 2019-060970

(51) Int. Cl.
*B60R 13/04* (2006.01)
*G01S 7/481* (2006.01)
*G01S 17/931* (2020.01)

(52) U.S. Cl.
CPC ............ *G01S 17/931* (2020.01); *B60R 13/04* (2013.01); *G01S 7/4811* (2013.01)

(58) Field of Classification Search
None
See application file for complete search history.

(56) References Cited

FOREIGN PATENT DOCUMENTS

| | | | | |
|---|---|---|---|---|
| DE | 10319176 A1 | * | 11/2004 | ............... B60R 1/12 |
| DE | 102007012993 A1 | * | 9/2007 | ............... B60J 1/02 |
| JP | 2009-300390 A | | 12/2009 | |
| JP | 6225380 B2 | | 11/2017 | |
| WO | 2018/052057 A1 | | 3/2018 | |

* cited by examiner

Primary Examiner — Hovhannes Baghdasaryan
(74) Attorney, Agent, or Firm — Posz Law Group, PLC

(57) ABSTRACT

A first fastening portion is provided on a surface on the inner side of a sensor cover. A first support portion is provided around an opening of an exterior component. The first fastening portion is fastened to the first support portion, with the first fastening portion being allowed to be unfastened from the first support portion. The exterior component includes a tubular wall portion. The tubular wall portion includes an attaching hole. Part of the near-infrared sensor is arranged inside the tubular wall portion through an attaching hole of the tubular wall portion. The near-infrared sensor includes a second fastening portion. The exterior component includes a second support portion on or outside the tubular wall portion. The second fastening portion is fastened to the second support portion, with the second fastening portion being allowed to be unfastened from the second support portion.

13 Claims, 7 Drawing Sheets

STRUCTURE FOR MOUNTING NEAR INFRARED SENSOR AND SENSOR COVER TO VEHICLE

CROSS REFERENCE TO RELATED APPLICATION

This application is a U.S. national stage application of International Application No. PCT/JP2020/011080, filed on Mar. 13, 2020, which claims priority to Japanese Patent Application No. 2019-060969 filed on Mar. 27, 2019, and Japanese Patent Application No. 2019-060970 filed on Mar. 27, 2019, the contents of which are incorporated herein by reference.

TECHNICAL FIELD

The present disclosure relates to a structure for mounting a near-infrared sensor and a sensor cover to a vehicle.

BACKGROUND ART

For example, Patent Document 1 discloses a vehicle equipped with a near-infrared sensor, an exterior component such as a front grille, and a sensor cover. The exterior component such as a front grille has an opening that is located forward of the near-infrared sensor in a transmission direction of near-infrared rays. The sensor cover includes a transmissive portion having transmissiveness to near-infrared rays.

The near-infrared sensor is configured to transmit near-infrared rays to the outside of the vehicle and receive the near-infrared rays that have struck and been reflected by an object outside the vehicle. The transmitted and received near-infrared rays are used to recognize the object, detect the distance between the vehicle and the object, and detect the relative velocity between the vehicle and the object.

The near-infrared sensor is located closer to the center of the vehicle than the opening (i.e. on the inner side of the opening). The transmissive portion of the sensor cover is located farther from the center of the vehicle than the opening (i.e. on the outer side of the opening) to cover the near-infrared sensor from the outer side.

PRIOR ART DOCUMENT

Patent Document

Patent Document 1: International Publication No. 2018/052057

SUMMARY OF THE INVENTION

Problems that the Invention is to Solve

In a vehicle equipped with the above-described near-infrared sensor and sensor cover, flying pebbles during traveling may hit the sensor cover, scratching or damaging the sensor cover. This can reduce the transmissiveness to near-infrared rays. Also, an extended use of the near-infrared sensor may reduce the sensing performance.

In such a case, it is desirable to replace the near-infrared sensor or sensor cover having reduced performance with another near-infrared sensor or sensor cover. However, Patent Document 1 does not particularly discuss such replacement of components.

It is an objective of the present disclosure to provide a structure for mounting a near-infrared sensor and a sensor cover to a vehicle that allows the near-infrared sensor and the sensor cover to be replaced separately.

Means for Solving the Problems

To achieve the foregoing objective, a structure for mounting a near-infrared sensor and a sensor cover to a vehicle is provided. The structure is adapted to a vehicle. The vehicle includes the near-infrared sensor, an exterior component, and the sensor cover. The near-infrared sensor is configured to transmit near-infrared rays to outside of the vehicle and receive the near-infrared rays that have struck and been reflected by an object outside the vehicle. The exterior component has an opening that is located forward of the near-infrared sensor in a transmission direction of near-infrared rays. The sensor cover includes a transmissive portion having transmissiveness to near-infrared rays and covers the near-infrared sensor from an outer side. The near-infrared sensor is located at an installation position that is set on an inner side of the opening. A first fastening portion is provided on a surface on an inner side of the sensor cover. A first support portion is provided around the opening of the exterior component. The first fastening portion is fastened to the first support portion, with the first fastening portion being allowed to be unfastened from the first support portion. The exterior component includes a tubular wall portion that projects toward the inner side from a peripheral edge of the opening. The tubular wall portion includes an attaching hole that is formed at an end portion on the inner side of the tubular wall portion. At the installation position, part of the near-infrared sensor is arranged inside the tubular wall portion through the attaching hole of the tubular wall portion. The near-infrared sensor includes a second fastening portion. The exterior component includes a second support portion on or outside the tubular wall portion. The second fastening portion is fastened to the second support portion, with the second fastening portion being allowed to be unfastened from the second support portion.

With the above-described configuration, when the first fastening portion is unfastened from the first support portion, the sensor cover can be detached from the exterior component. When the first fastening portion is fastened to the first support portion, the sensor cover is attached to the exterior component. Thus, when the transmissiveness to near-infrared rays of the sensor cover is reduced, a replacement operation can be performed. That is, the sensor cover can be detached from the exterior component, and another sensor cover, of which the transmissiveness has not been reduced, can be attached to the exterior component.

When the second fastening portion is unfastened from the second support portion, the near-infrared sensor can be pulled out from the tubular wall portion, so that the near-infrared sensor is detached from the exterior component. Part of the near-infrared sensor is arranged inside the tubular wall portion through the attaching hole. If the second fastening portion is fastened to the second support portion in this state, the near-infrared sensor is attached to the exterior component. Thus, when the sensing performance of the near-infrared sensor is reduced, a replacement operation can be performed. That is, the near-infrared sensor can be detached from the exterior component, and another sensor, of which the sensing performance has not been reduced, can be attached to the exterior component.

In the above-described the structure for mounting the near-infrared sensor and the sensor cover to the vehicle, the transmissive portion is preferably arranged on the outer side of the opening. The near-infrared sensor preferably includes a flange at an outer periphery of the near-infrared sensor. The flange preferably allows the near-infrared sensor to be inserted to the installation position from the inner side through the attaching hole. The flange preferably restricts the near-infrared sensor from being inserted to the installation position from the outer side through the attaching hole.

With the above-described configuration, the replacement of the sensor cover is performed on the outer side of the opening. That is, when the first fastening portion is unfastened from the first support portion, the sensor cover, of which the transmissiveness to near-infrared rays has been reduced, can be detached from the exterior component to the outer side. Then, another sensor cover, of which the transmissiveness to near-infrared rays has not been reduced, can be attached to the exterior component by bringing the sensor cover closer to the exterior component from the outer side and fastening the first fastening portion to the first support portion.

In contrast, replacement of the near-infrared sensor is performed on the inner side of the opening. That is, when the second fastening portion is unfastened from the second support portion, the near-infrared sensor, of which the sensing performance has been reduced, can be detached from the exterior component by being pulled out toward the inner side of the tubular wall portion through the attaching hole. Then, another near-infrared sensor, of which the sensing performance has not been reduced, can be attached to the exterior component by inserting part of the near-infrared sensor into the tubular wall portion through the attaching hole from the inner side and fastening the second fastening portion to the second support portion.

Therefore, the near-infrared sensor is unlikely to hinder replacement of the sensor cover. Likewise, the sensor cover is unlikely to hinder replacement of the near-infrared sensor.

In the above-described structure for mounting the near-infrared sensor and the sensor cover to the vehicle, the first support portion and the second support portion are preferably provided on the inner side of the opening. The second support portion is preferably displaced from the first support portion in a circumferential direction of the opening.

With the above-described configuration, the first fastening portion is unfastened from and fastened to the first support portion from the inner side of the opening. Also, the second fastening portion is unfastened from and fastened to the second support portion from the inner side of the opening. The first support portion and the second support portion are located at positions displaced from each other in the circumferential direction of the opening.

Thus, the first fastening portion can be fastened to or unfastened from the first support portion without being significantly influenced by the position at which the second fastening portion is fastened to the second support portion. Likewise, the second fastening portion can be fastened to or unfastened from the second support portion without being significantly influenced by the position at which the first fastening portion is fastened to the first support portion. Accordingly, replacement of the sensor cover and replacement of the near-infrared sensor are facilitated.

In the above-described structure for mounting the near-infrared sensor and the sensor cover to the vehicle, a bracket is preferably attached to the near-infrared sensor. The bracket is preferably located on the inner side of the opening and outside the tubular wall portion. The second fastening portion is preferably arranged in the bracket. The second support portion is preferably located on the inner side of the opening and outside the tubular wall portion.

With the above-described configuration, when the second fastening portion of the bracket is unfastened from the second support portion of the exterior component, the near-infrared sensor can be detached from the exterior component. When the second fastening portion is fastened to the second support portion, the near-infrared sensor is indirectly attached to the exterior component with the bracket.

In the above-described structure for mounting the near-infrared sensor and the sensor cover to the vehicle, part of the near-infrared sensor that is on the outer side of the flange is preferably arranged inside the tubular wall portion through the attaching hole. The second fastening portion is preferably provided in the flange. The second support portion is preferably provided in part of the end portion of the tubular wall portion that surrounds the attaching hole.

With the above-described configuration, when the second fastening portion of the flange of the near-infrared sensor is unfastened from the second support portion at the end portion on the inner side of the tubular wall portion, the near-infrared sensor can be pulled out from the tubular wall portion through the attaching hole, so as to be detached from the exterior component. When the second fastening portion of the flange is fastened to the second support portion of the tubular wall portion, the near-infrared sensor is directly attached to the exterior component.

In the above-described structure for mounting the near-infrared sensor and the sensor cover to the vehicle, the first support portion preferably includes a first fastening hole that is formed in part of the exterior component that is on the inner side of the first fastening portion. A first screw is preferably threaded into the first fastening portion through the first fastening hole.

With the above-described configuration, when the first screw is rotated to be loosened and taken out from the first fastening portion and the first fastening hole, the first fastening portion is unfastened from the first support portion, so that the sensor cover can be detached from the exterior component.

When the first screw is inserted into the first fastening hole and rotated to be tightened, the first screw is threaded into the first fastening portion. The first fastening portion is fastened to the first support portion, so that the sensor cover is attached to the exterior component.

In the above-described structure for mounting the near-infrared sensor and the sensor cover to the vehicle, the second fastening portion preferably includes a second fastening hole that is formed in part of the bracket that is on the inner side of the second support portion. A second screw is preferably threaded into the second support portion through the second fastening hole.

With the above-described configuration, when the second screw is rotated to be loosened and taken out from the second support portion and the second fastening hole, the second fastening portion is unfastened from the second support portion, so that the near-infrared sensor can be detached from the exterior component.

When the second screw is inserted into the second fastening hole and rotated to be tightened, the second screw is threaded into the second support portion. The second fastening portion is fastened to the second support portion, so that the near-infrared sensor is indirectly attached to the exterior component with the bracket.

In the above-described structure for mounting the near-infrared sensor and the sensor cover to the vehicle, the second fastening portion preferably includes a second fastening hole that is formed in part of the flange that is on the inner side of the second support portion. A second screw is preferably threaded into the second support portion through the second fastening hole.

With the above-described configuration, when the second screw is rotated to be loosened and taken out from the second support portion and the second fastening hole, the second fastening portion is unfastened from the second support portion, so that the near-infrared sensor can be detached from the exterior component.

When the second screw is inserted into the second fastening hole and rotated to be tightened, the second screw is threaded into the second support portion. The second fastening portion is fastened to the second support portion, so that the near-infrared sensor is directly attached to the exterior component.

In the above-described structure for mounting the near-infrared sensor and the sensor cover to the vehicle, the transmissive portion is preferably arranged on the outer side of the opening. An annular seal portion is preferably arranged between the sensor cover and the exterior component at a position surrounding the opening.

If water collects on the outer surface of the near-infrared sensor, through which near-infrared rays are received or transmitted, the sensing performance is influenced and may be reduced.

However, the above-described configuration includes the annular seal portion located between the sensor cover and the exterior component at the position surrounding the opening. The seal portion restricts water from entering the inner side of the opening from the outer side of the opening through the gap between the sensor cover and the exterior component. Water is therefore unlikely to collect on the outer surface of the near-infrared sensor, which is located on the inner side of the opening.

In the above-described structure for mounting the near-infrared sensor and the sensor cover to the vehicle, the seal portion is preferably fixed to the sensor cover.

With the above-described configuration, the seal portion is fixed to and integrated with the sensor cover. Thus, when the sensor cover is detached from or attached to the exterior component, the seal portion is detached or attached to the exterior component together with the sensor cover. Therefore, when the sealing performance of the seal portion is reduced, the seal portion can be replaced by replacing the sensor cover. The sealing performance is thus ensured.

In the above-described structure for mounting the near-infrared sensor and the sensor cover to the vehicle, the seal portion is preferably arranged between the opening and a section of the first fastening portion that is fastened to the first support portion.

With the above-described configuration, even if there is entry of water through the position at which the fastening portion is fastened to the support portion, the water is restricted from entering the inner side of the opening by the seal portion, which surrounds the opening. Water is therefore further unlikely to collect on the outer surface of the near-infrared sensor.

In the above-described structure for mounting the near-infrared sensor and the sensor cover to the vehicle, the near-infrared sensor preferably includes a flange at an outer periphery. At the installation position, part of the near-infrared sensor that is on the outer side of the flange is preferably inserted into the attaching hole to be arranged inside the tubular wall portion.

With the above-described configuration, the tubular wall portion surrounds the part of the near-infrared sensor that is inserted into the attaching hole and is located inside the tubular wall portion, that is, the part of the near-infrared sensor that is on the outer side of the flange. The surface on the outer side of the near-infrared sensor is located inside the tubular wall portion. This restricts water on the inner side of the opening from entering the tubular wall portion. Water is therefore further unlikely to collect on the outer surface of the near-infrared sensor.

In the above-described structure for mounting the near-infrared sensor and the sensor cover to the vehicle, the seal portion is preferably a first seal portion, and an annular second seal portion is preferably arranged between the end portion of the tubular wall portion and the flange of the near-infrared sensor.

With the above-described configuration, the attaching hole is surrounded by the annular second seal portion, which is arranged between the end portion on the inner side of the tubular wall portion and the flange of the near-infrared sensor. The second seal portion restricts water on the inner side of the opening from entering the tubular wall portion from the attaching hole through the gap between the end portion and the flange. Water is therefore further unlikely to collect on the outer surface of the near-infrared sensor.

Effects of the Invention

The above-described structure for mounting a near-infrared sensor and a sensor cover to a vehicle allows the near-infrared sensor and the sensor cover to be replaced separately.

MODES FOR CARRYING OUT THE INVENTION

First Embodiment

A structure for attaching a near-infrared sensor and a sensor cover to a vehicle according to a first embodiment will now be described with reference to FIGS. 1 to 7. The near-infrared sensor is used to monitor the situation forward of a vehicle, and the sensor cover is used with the near-infrared sensor.

In the following description, the direction in which the vehicle advances forward will be referred to as the front, and the reverse direction will be referred to as the rear. The vertical direction refers to the vertical direction of the vehicle, and the left-right direction refers to the vehicle width direction that agrees with the left-right direction when the vehicle is advancing forward.

First, a front grille 10 of the vehicle will be described. A near-infrared sensor and a sensor cover are attached to the front grille 10. Subsequently, a near-infrared sensor 30, which is arranged rearward of the front grille 10 and attached to the front grille 10 (vehicle), and a sensor cover 55, which is arranged forward of the front grille 10 and attached to the front grille 10 (vehicle), will be described independently.

The "front" in the front-rear direction of the vehicle corresponds to an "outer side" in the relationship among three components: the near-infrared sensor, the sensor cover, and the front grille. Also, the "rear" in the front-rear direction corresponds to an "inner side" in the relationship among the three components.

<Front Grille 10>

Figure 1:
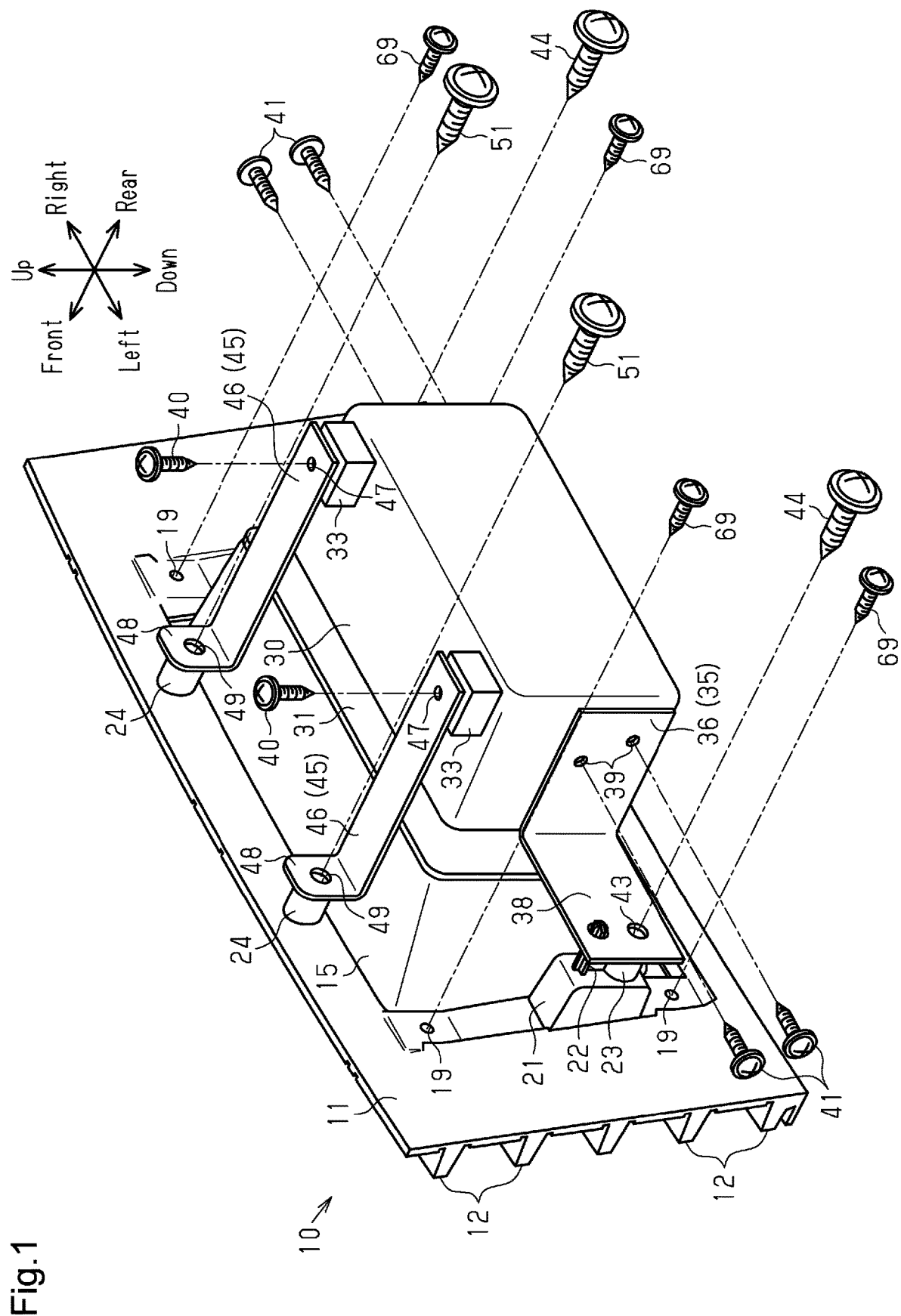
FIG. 1 is a perspective view of a first embodiment as viewed from diagonally behind, illustrating a state before a near-infrared sensor and a sensor cover are attached to a front grille.
Figure 2:
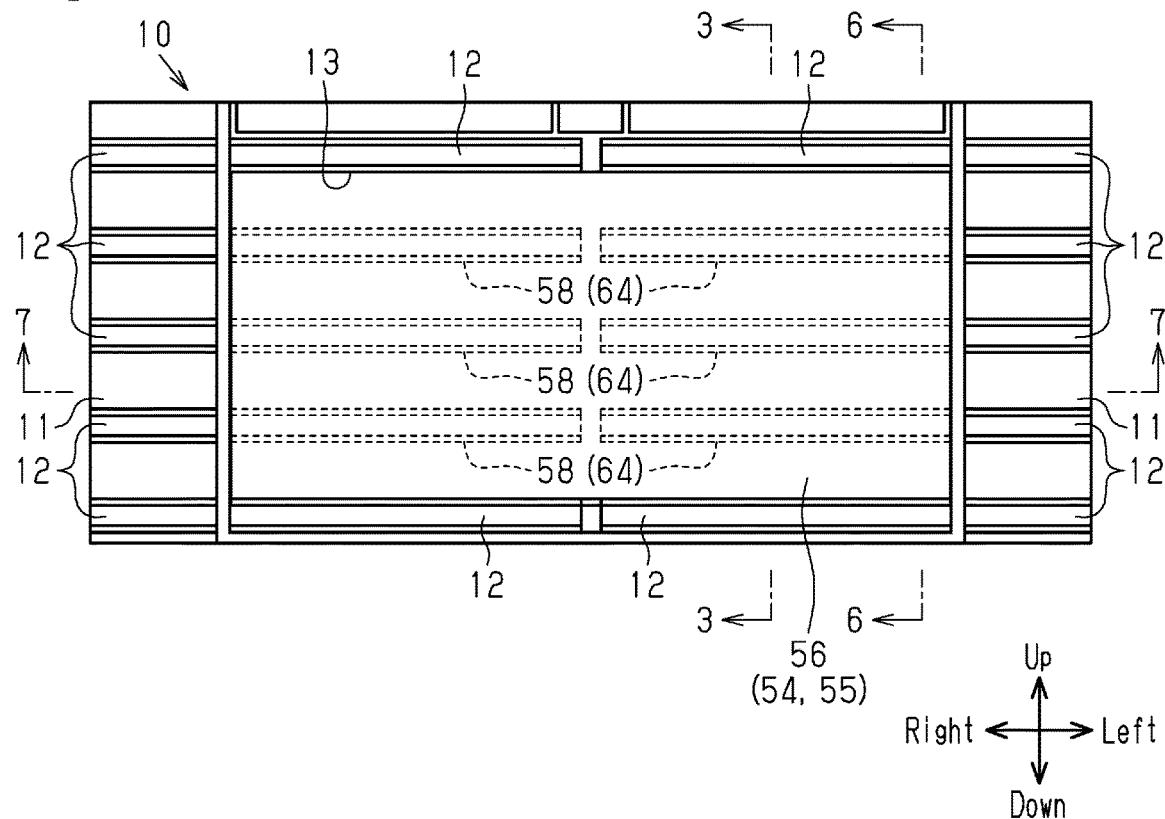
FIG. 2 is a front view partly showing the front grille of the first embodiment, to which the near-infrared sensor and the sensor cover are attached.

As shown in FIGS. 1 and 2, the vehicle includes the front grille 10, which is an exterior component, at the front end of the vehicle body. FIGS. 1 and 2 partially illustrate the front grille 10. The front grille 10 includes a plate portion 11 and lateral lattice portions 12 formed on the front surface of the plate portion 11. The plate portion 11 is arranged in an upright state. The lateral lattice portions 12 extend in the left-right direction, while projecting forward from the plate portion 11. The lateral lattice portions 12 are spaced apart from each other in the vertical direction. The surfaces of the lateral lattice portions 12 are plated to have metallic luster.

Figure 3:
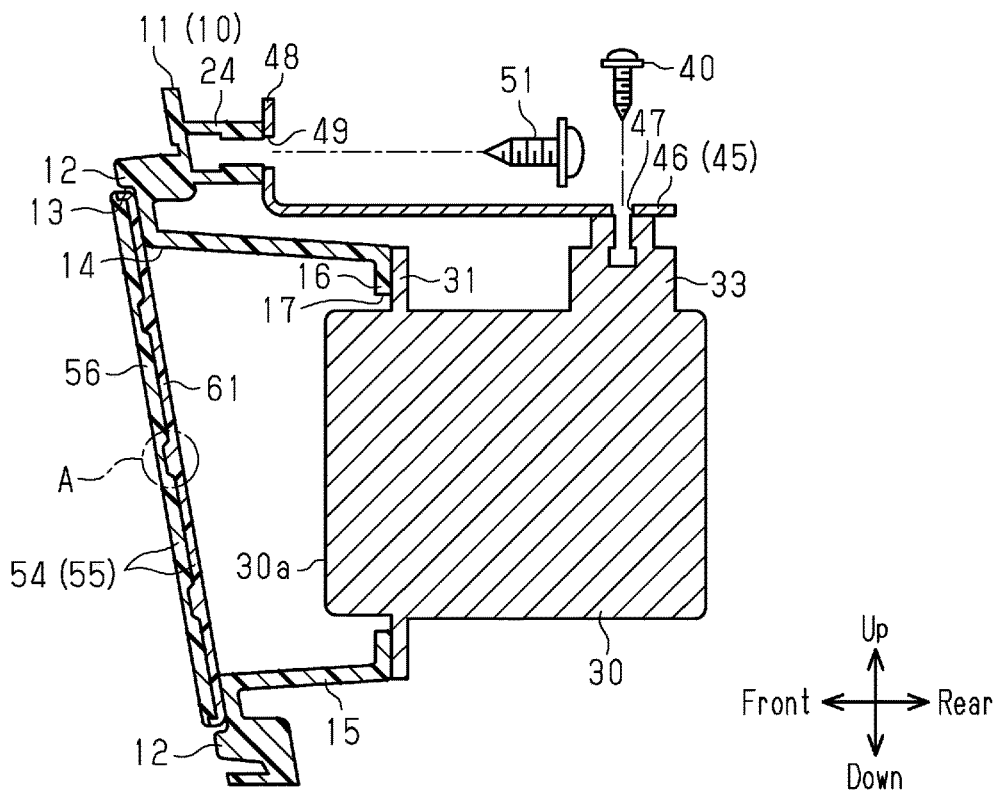
FIG. 3 is a cross-sectional view taken along line 3-3 in FIG. 2.
Figure 5:
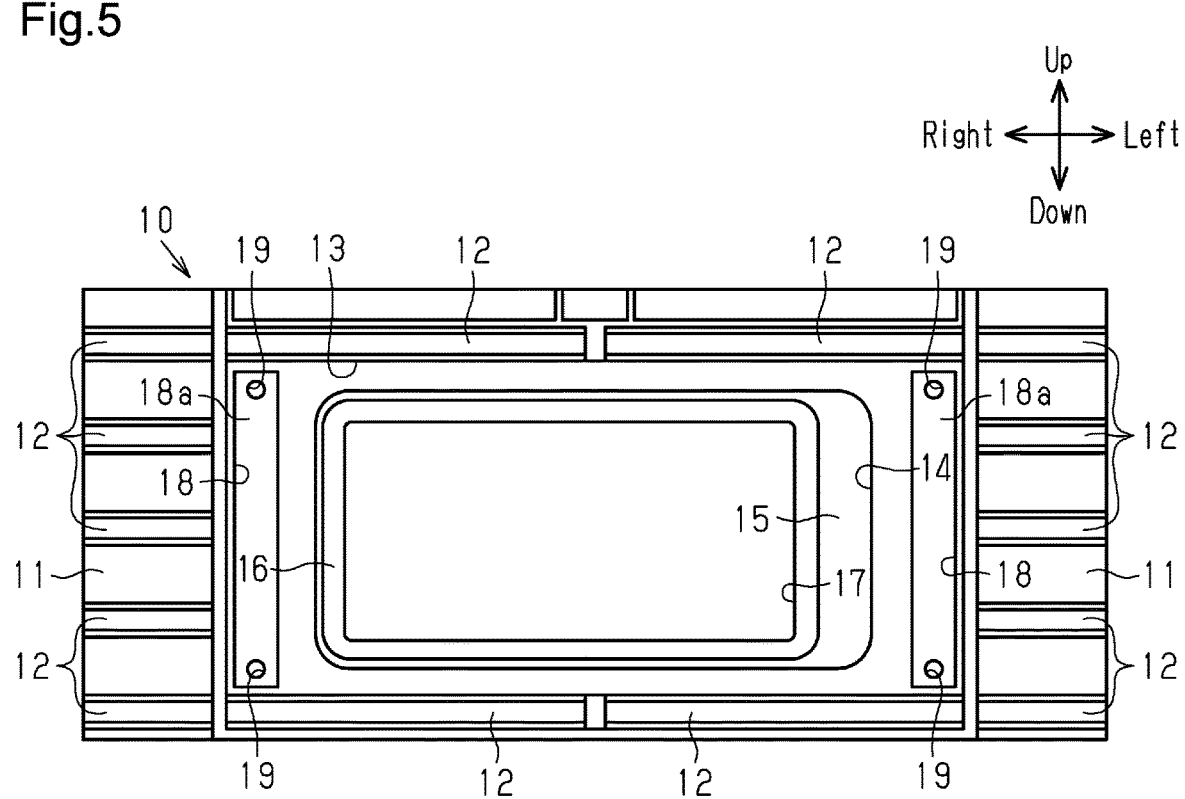
FIG. 5 is a front view showing a state in which the near-infrared sensor and the sensor cover have been removed from the front grille of FIG. 2.

As shown in FIGS. 3 and 5, the front grille 10 has a step portion 13 at the center in the left-right direction. The step portion 13 is recessed rearward with respect to the front surfaces of the lateral lattice portions 12. The step portion 13 splits some of the lateral lattice portions 12 into segments at the center in the left-right direction. The segments in the left-right direction of the lateral lattice portions 12 on the opposite sides of the step portion 13 are spaced apart from each other in the left-right direction with the step portion 13 in between.

The step portion 13 has an opening 14 at the center in the left-right direction and the vertical direction. The section of the front grille 10 in which the opening 14 is formed corresponds to a position forward of the near-infrared sensor 30 in the transmission direction of the near-infrared rays. The opening 14 has a substantially rectangular shape with the dimension in the left-right direction being longer than the dimension in the vertical direction. The step portion 13 includes a tubular wall portion 15 extending rearward from the peripheral edge of the opening 14. The tubular wall portion 15 has a substantially rectangular shape and a bottom. The tubular wall portion 15 has an end portion 16 on the projecting side (rear side), and an attaching hole 17 in the end portion 16.

Figure 6:
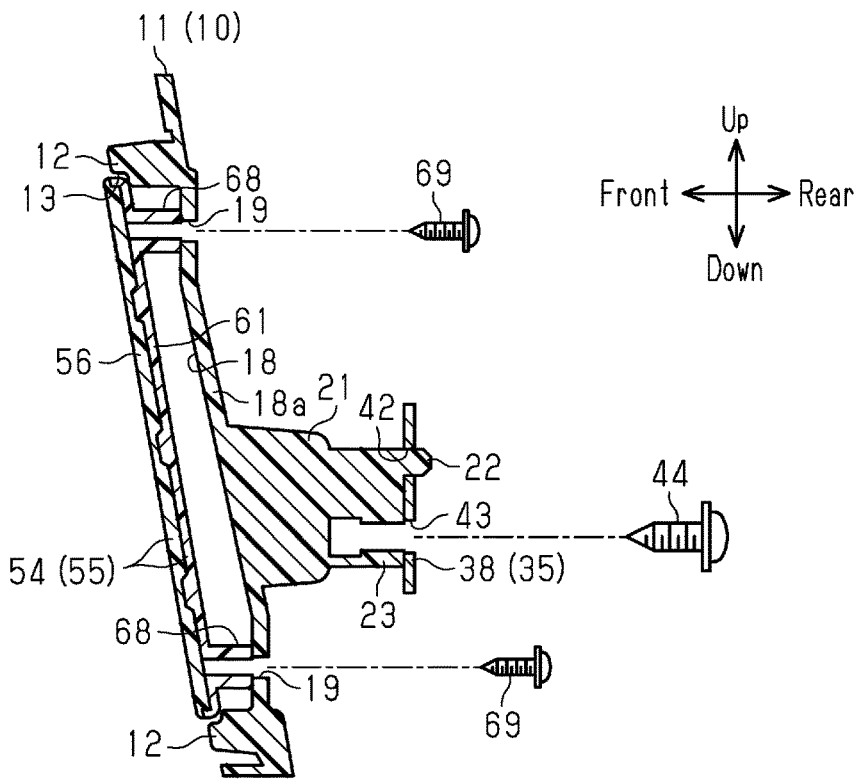
FIG. 6 is a cross-sectional view taken along line 6-6 in FIG. 2.

As shown in FIGS. 5 and 6, vertically elongated recesses 18, which are open forward, are formed on the opposite sides in the left-right direction of the step portion 13. Each recess 18 has, on an inner bottom portion 18a, first support portions at positions rearward of first bosses 68, which will be discussed below. The first support portions are located around the opening 14 and rearward of the opening 14. The first support portions include two first fastening holes 19 at the upper end and the lower end of the inner bottom portion 18a of each recess 18, and parts of the inner bottom portion 18a that surround the first fastening holes 19.

As shown in FIGS. 1 and 6, the plate portion 11 has projections 21 at positions rearward of the recesses 18 and between the first fastening holes 19 in the vertical direction. The projections 21 project rearward. The projections 21 are located outside the tubular wall portion 15. Each projection 21 has a shaft portion 22, which is located in an upper part and projects rearward. Each projection 21 also has a second boss 23, which is located below the shaft portion 22 and projects rearward. The second bosses 23 are formed as part of the second support portions.

As shown in FIGS. 1 and 3, the front grille 10 has second bosses 24 at positions rearward of the opening 14 and outside the tubular wall portion 15. The second bosses 24 project rearward and are formed as part of the second support portions. In the first embodiment, the second bosses 24 are located at positions (two positions), which are above the opening 14 and the tubular wall portion 15 in the front grille 10, and spaced apart from each other in the left-right direction. The second bosses 23, 24 are located at positions displaced from the first fastening holes 19 in the circumferential direction of the opening 14. The second bosses 23 and the second bosses 24 are located at positions displaced from each other in the circumferential direction of the opening 14.

<Near-Infrared Sensor 30>

The near-infrared sensor 30 is arranged at an installation position, which is set rearward of the opening 14. The near-infrared sensor 30 has a front end face 30a, which is separated rearward from the opening 14.

The near-infrared sensor 30 is configured to transmit near-infrared rays forward from the vehicle and receive the near-infrared rays that have struck and been reflected by an object in front of the vehicle, such as a leading vehicle or a pedestrian. The near-infrared rays are electromagnetic waves and have wavelengths that are longer than the wavelengths of visible light and shorter than the infrared rays. On the basis of the transmitted near-infrared rays and the received near-infrared rays, the near-infrared sensor 30 recognizes the object in front of the vehicle, and detects the distance between the vehicle and the object and the relative velocity.

The near-infrared sensor 30 includes a plate-shaped flange 31 at the outer periphery at the front end. The flange 31 has a function of allowing the near-infrared sensor 30 to be inserted to the above-described installation position from the rear side through the attaching hole 17. The flange 31 also has a function of restricting the near-infrared sensor 30 from being inserted to the above-described installation position from the front side through the attaching hole 17.

At the above-described installation position, part of the near-infrared sensor 30 that is forward of the flange 31 is inserted into the attaching hole 17 from the rear side and is located inside the tubular wall portion 15. The flange 31 is located rearward of the end portion 16, and is close to or in contact with the end portion 16. The near-infrared sensor 30 has a front end face 30a, which is separated rearward from the opening 14. The part of the near-infrared sensor 30 that is rearward of the flange 31 is located outside the tubular wall portion 15 and rearward of the end portion 16.

Figure 7:
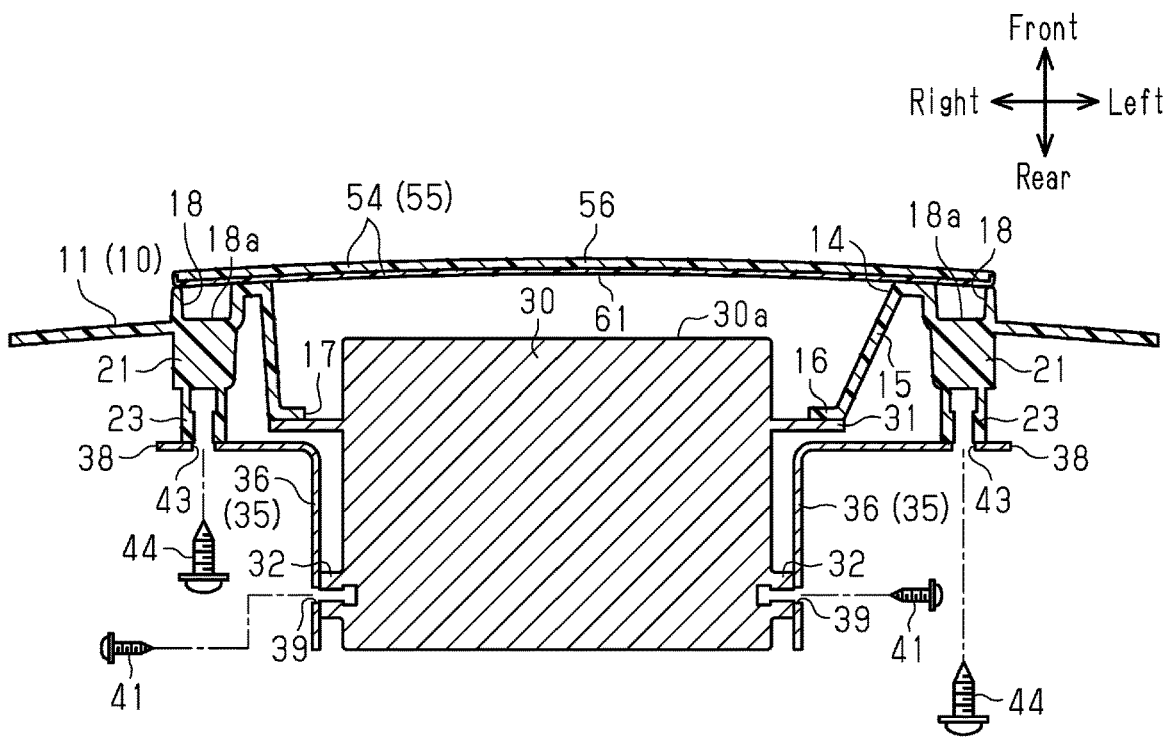
FIG. 7 is a cross-sectional view taken along line 7-7 in FIG. 2.

As shown in FIG. 7, the near-infrared sensor 30 includes attaching projections 32 on the opposite sides in the left-right direction. As shown in FIGS. 1 and 3, the near-infrared sensor 30 includes attaching projections 33 at the rear end on the upper surface. The attaching projections 33 are located at two positions spaced apart from each other in the left-right direction.

As shown in FIGS. 1, 3, and 7, multiple brackets are attached to the near-infrared sensor 30. The brackets are located rearward of the opening 14 and outside the tubular wall portion 15. The brackets include a pair of lateral brackets 35 and a pair of vertical brackets 45. The lateral brackets 35 and the vertical brackets 45 are each formed by bending a plate made of a hard material such as a metal.

The lateral brackets 35 are arranged close to the left and right sides of the near-infrared sensor 30. Each lateral bracket 35 includes an arm 36 and an attaching portion 38. The arms 36 extend in the front-rear direction along the left and right side surfaces of the near-infrared sensor 30. The attaching portions 38 are connected to the front ends of the arms 36, and extend away from the near-infrared sensor 30 in the left-right direction.

Each arm 36 has multiple holes 39. A screw 41 is inserted into each hole 39 and threaded into the corresponding attaching projection 32. The tightening action caused by threading the screws 41 attaches each lateral bracket 35 to the corresponding attaching projections 32 at the arm 36.

Each attaching portion 38 has a positioning hole 42 in an upper portion (see FIG. 6). Also, each attaching portion 38 has a second fastening hole 43 at a position below the positioning hole 42 and rearward of the second boss 23. The second fastening hole 43 and a part of the attaching portion 38 that surrounds the second fastening hole 43 form a part of a second fastening portion.

Each vertical bracket 45 includes an arm 46 and an attaching portion 48. The arms 46 extend in the front-rear direction along the upper surface of the near-infrared sensor 30. The attaching portions 48 are connected to the front ends of the arms 46, and extend upward.

Each arm 46 has a hole 47 at the rear end. A screw 40 is inserted into each hole 47 and threaded into the corresponding attaching projection 33. The tightening action caused by threading the screws 40 attaches each vertical bracket 45 to the corresponding attaching projection 33 at the arm 36.

Each attaching portion 48 has a second fastening hole 49 at a position rearward of the corresponding second boss 24. The second fastening hole 49 and a part of the attaching portion 48 that surrounds the second fastening hole 49 form a part of a second fastening portion.

The positioning hole 42 of each attaching portion 38 receives the corresponding shaft portion 22, so that the lateral bracket 35 is positioned in relation to the front grille 10. The second fastening hole 43 of each attaching portion 38 receives a second screw 44 from the rear side. The second screw 44 is threaded into the corresponding second boss 23. The second fastening hole 49 of each attaching portion 48 receives a second screw 51 from the rear side. The second screw 51 is threaded into the corresponding second boss 24. The tightening action caused by threading the second screws 44, 51 fastens the near-infrared sensor 30 to the front grille 10 with the lateral brackets 35 and the vertical brackets 45, while allowing the near-infrared sensor 30 to be unfastened.

<Sensor Cover 55>

Figure 4:
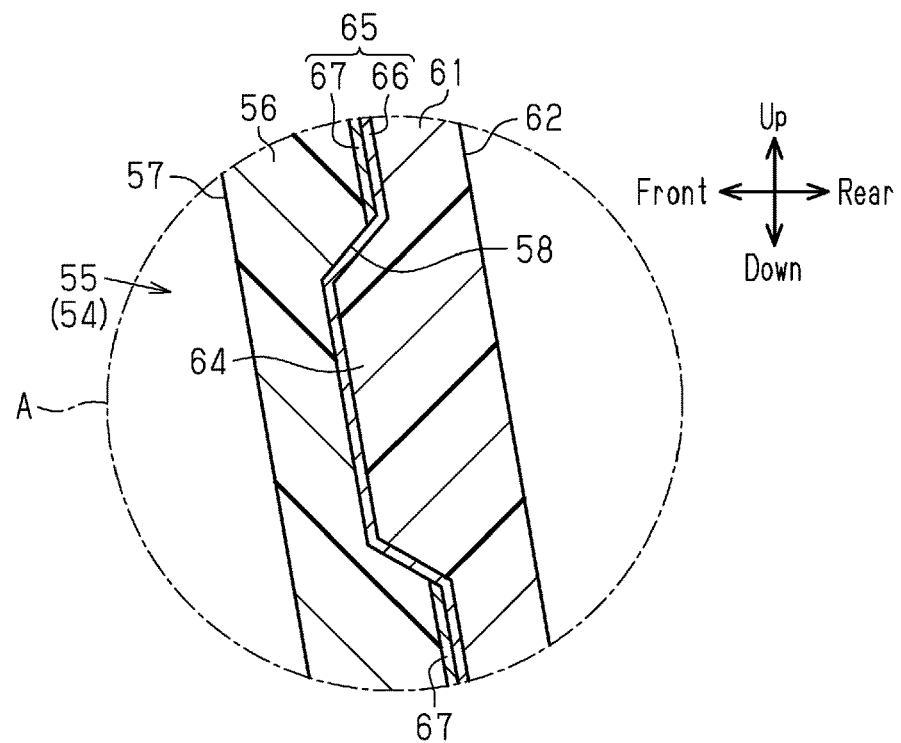
FIG. 4 is an enlarged partial cross-sectional view showing section A in FIG. 3.

As shown in FIGS. 2 to 4, the sensor cover 55 includes a transmissive portion 54. The transmissive portion 54 has transmissiveness to near-infrared rays and is located forward of the opening 14. The sensor cover 55 is separated forward from the front end face 30a of the near-infrared sensor 30. The sensor cover 55 (transmissive portion 54) includes an outer base 56, a decorative layer 65, and an inner base 61. The decorative layer 65 is not illustrated in FIG. 3. The same applies to FIGS. 6 to 13.

The outer base 56 and the inner base 61 are both made of a transparent plastic having transmissiveness to near-infrared rays. The term "transparent" as used in this description includes not only "colorless transparent," but also "colored transparent." Examples of such a plastic include, for example, polycarbonate (PC) and polymethyl methacrylate (PMMA). The outer base 56 and the inner base 61 may be made of the same plastic, or made of different plastics.

The outer base 56 has a front surface 57, which is flat and forms a decorative surface of the sensor cover 55. Also, the outer base 56 has recesses 58 in the back. The recesses 58 are spaced apart in the vertical direction from each other, and extend in the left-right direction.

The inner base 61 is arranged rearward of the outer base 56. The inner base 61 has a flat rear surface 62. The inner base 61 has projections 64 in the front part. The projections 64 are spaced apart in the vertical direction from each other and extend in the left-right direction. Each projection 64 is fitted in the corresponding one of the recesses 58 of the outer base 56.

The combination of the recesses 58 and the projections 64 are provided in a part of the lateral lattice portions 12 of the front grille 10. Specifically, the combination is provided in the region divided by the step portion 13, which is a band-shaped region extending in the left-right direction. The combination is located at the same position or the substantially the same position as the lateral lattice portions 12 in the vertical direction, and has the same vertical width or the substantially the same vertical width as the lateral lattice portions 12.

The decorative layer 65 is a layer that decorates the sensor cover 55, and is formed between the outer base 56 and the inner base 61. The decorative layer 65 includes a lustrous decorative layer 66 and a colored decorative layer 67.

The colored decorative layer 67 is made of a material having a high transmissivity to near-infrared rays and a low transmissivity to visible light, such as an infrared transmissive ink (IR ink). The colored decorative layer 67 is, for example, black, blue, or red. The colored decorative layer 67 is formed on the rear surface of the outer base 56, except for the area of the recesses 58, through printing such as screen printing.

The lustrous decorative layer 66 is formed by subjecting the inner wall surfaces of the recesses 58 of the outer base 56 and the entire rear surface of the colored decorative layer 67 to sputtering, vapor-deposition, or coating. The lustrous decorative layer 66 has metallic luster that is the same as or similar to the metallic luster of the lateral lattice portions 12, and reflects visible light and allows near-infrared rays to pass through.

As shown in FIG. 6, the inner base 61 has first bosses 68 in the four corners on the rear surface. The first bosses 68 serve as first fastening portions and project rearward. Each first boss 68 is fitted in the corresponding one of the recesses 18. A first screw 69 is inserted into each first fastening hole 19 from the rear side and threaded into the corresponding first boss 68. The tightening action caused by threading the first screws 69 fastens the sensor cover 55 to the front grille 10, while allowing the sensor cover 55 to be unfastened.

An operation of the first embodiment, which is configured as described above, will now be described. Advantages that accompany the operation will also be described.

When the near-infrared sensor 30 transmits near-infrared rays, the near-infrared rays pass through the transmissive portion 54 of the sensor cover 55 shown in FIG. 4, that is, the inner base 61, the decorative layer 65, and the outer base 56 in that order. After passing through the transmissive portion 54, the near-infrared rays strike, and are reflected by, an object in front of the vehicle, such as a leading vehicle or a pedestrian, and then pass through the outer base 56, the decorative layer 65, and the inner base 61 of the transmissive portion 54 in that order. After passing through the sensor cover 55 (transmissive portion 54), the near-infrared rays are received by the near-infrared sensor 30. On the basis of the transmitted and received near-infrared rays, the near-infrared sensor 30 recognizes the object and detects the distance between the vehicle and the object and the relative velocity.

The sensor cover 55 is unlikely to hinder passing of the transmitted and reflected near-infrared rays through the sensor cover 55. The amount of the near-infrared rays that is attenuated by the sensor cover 55 is limited to a permissible range. This allows the near-infrared sensor 30 to properly perform functions such as the detecting function described above.

When the sensor cover 55 is irradiated with visible light from the front side, the visible light passes through the outer base 56, and is reflected by the colored decorative layer 67 and the lustrous decorative layer 66 of the decorative layer 65.

When the sensor cover 55 is seen from a position forward of the vehicle, the decorative layer 65 is seen through the outer base 56 and appears to be located rearward of (on the far side of) the outer base 56. The color of the colored decorative layer 67 of the decorative layer 65 is visible. The lustrous decorative layer 66 of the decorative layer 65 appears to be glittering like metal. The decorative layer 65 thus decorates the sensor cover 55, improving the appearance of the sensor cover 55 and the surrounding portion.

Particularly, the decorative layer 65 is provided between the outer base 56 and the inner base 61 and has asperities. Thus, when the sensor cover 55 is seen from a position forward of the vehicle, the lustrous decorative layer 66 appears to be located forward of (on the near side of) the colored decorative layer 67. This further improves the appearance of the sensor cover 55 and the surrounding portion.

As shown in FIGS. 2 and 4, the lustrous decorative layer 66 is located in a region of the lateral lattice portions 12 that is divided by the step portion 13. From a position forward of the vehicle, the segments in the left-right direction of the lateral lattice portions 12 on the opposite sides of the step portion 13 appear to be connected to form straight lines with the lustrous decorative layer 66 in between. This further increases the consistency between the sensor cover 55 and the front grille 10, improving the aesthetic appeal.

The reflection of visible light on the decorative layer 65 occurs at a position forward of the near-infrared sensor 30. The decorative layer 65 conceals the near-infrared sensor 30. Accordingly, the near-infrared sensor 30 cannot be seen easily from the front of the sensor cover 55. The aesthetic appeal is thus improved as compared to a case in which the near-infrared sensor 30 can be seen through the sensor cover 55.

If flying pebbles or the like scratch or damage the sensor cover 55, so that the transmissiveness to near-infrared rays deteriorates, the first screws 69 shown in FIGS. 1 and 6 are rotated to be loosened and removed from the first bosses 68 and the first fastening holes 19. Accordingly, the first bosses 68 are unfastened from the parts of the inner bottom portions 18a of the recesses 18 that surround the first fastening holes 19. The sensor cover 55 is removed forward from the front grille 10.

Next, another sensor cover 55, of which the transmissiveness to near-infrared rays has not been reduced, is brought closer to the front grille 10 from the front. Each first boss 68 is inserted into the corresponding recess 18. While being aligned with the first fastening holes 19, the first bosses 68 are brought close to or into contact with the inner bottom portions 18a. The first screws 69 are inserted into the first fastening holes 19 of the front grille 10 from the rear side, and are rotated to be tightened. This rotation causes the first screws 69 to be threaded into the first bosses 68, so that the first bosses 68 are fastened to the parts of the inner bottom portions 18a that surround the first fastening holes 19. The sensor cover 55 is thus attached to the front grille 10. The sensor cover 55 is replaced in this manner.

When the sensing performance of the near-infrared sensor 30 is reduced, the second screws 44 are rotated to be loosened and removed from the second bosses 23 and the second fastening holes 43 as shown in FIGS. 3 and 7. Accordingly, the part of each attaching portion 38 that surrounds the second fastening hole 43 is unfastened from the corresponding second boss 23. Also, the second screws 51 are rotated to be loosened and removed from the second bosses 24 and the second fastening holes 49. Accordingly, the part of each attaching portion 48 that surrounds the second fastening hole 49 is unfastened from the corresponding second boss 24. The near-infrared sensor 30, to which the lateral brackets 35 and the vertical brackets 45 are attached, is taken out rearward from the attaching hole 17 of the tubular wall portion 15, so as to be removed from the front grille 10.

Then, another near-infrared sensor 30, of which the sensing performance has not been reduced and to which the lateral brackets 35 and the vertical brackets 45 are attached, is brought closer to the front grille 10 from the rear side, and the part forward of the flange 31 is inserted into the attaching hole 17. When the flange 31 is brought close to or in contact with the end portion 16, the near-infrared sensor 30 is arranged at the installation position. At the installation position, the attaching portion 38 of each lateral bracket 35 is close to or in contact with the second boss 23 of the corresponding projection 21, and the attaching portion 48 of each vertical bracket 45 is close to or in contact with the corresponding second boss 24. The second screws 44 are inserted into the second fastening holes 43 of the respective lateral brackets 35 from the rear side, and are rotated to be tightened. This rotation causes the second screws 44 to be threaded into the second bosses 23, so that the parts of the attaching portions 38 that surround the second fastening holes 43 are fastened to the second bosses 23. Also, the second screws 51 are inserted into the second fastening holes 49 of the respective vertical brackets 45 from the rear side, and are rotated to be tightened. This rotation causes the second screws 51 to be threaded into the second bosses 24, so that the parts of the attaching portions 48 that surround the second fastening holes 49 are fastened to the second bosses 24. These fastening operations indirectly attach the near-infrared sensor 30 to the front grille 10 with the lateral brackets 35 and the vertical brackets 45. The near-infrared sensor 30 is replaced in this manner.

In the first embodiment, replacement of the sensor cover 55 is performed at a position forward of the opening 14. In contrast, replacement of the near-infrared sensor 30 is performed at a position rearward of the opening 14. The near-infrared sensor 30 is thus unlikely to hinder replacement of the sensor cover 55. Also, the sensor cover 55 is unlikely to hinder replacement of the near-infrared sensor 30.

Also, as shown in FIG. 6, the first bosses 68 are fastened to and unfastened from the parts of the inner bottom portion 18a of each recess 18 that surround the first fastening holes 19, at a position rearward of the opening 14. Likewise, the parts of the attaching portions 38 that surround the second fastening holes 43 are fastened to and unfastened from the second bosses 23 at a position rearward of the opening 14, as shown in FIG. 7. Also, the parts of the attaching portions 48 that surround the second fastening holes 49 are fastened to and unfastened from the second bosses 24 at a position rearward of the opening 14, as shown in FIG. 3. The above-described fastening and unfastening operations are performed at positions displaced from each other in the circumferential direction of the opening 14.

Therefore, the first bosses 68 can be fastened to or unfastened from the inner bottom portions 18a without being influenced by the positions at which the attaching portions 38 are fastened to the second bosses 23 (see FIG. 7) or by the positions at which the attaching portions 48 are fastened to the second bosses 24 (see FIG. 3). Likewise, the attaching portions 38 and the attaching portions 48 can be respectively fastened to or unfastened from the second bosses 23 and the second bosses 24 without being influenced by the positions at which the first bosses 68 are fastened to the inner bottom portions 18a (see FIG. 6). Further, the attaching portions 38 can be fastened to or unfastened from the second bosses 23 without being influenced by the positions at which the attaching portions 48 are fastened to the second bosses 24 (see FIG. 3). Also, the attaching portions 48 can be fastened to or unfastened from the second bosses 24 without being influenced by the positions at which the attaching portions 38 are fastened to the second bosses 23 (see FIG. 7).

Accordingly, the replacement of the sensor cover 55 and the replacement of the near-infrared sensor 30 are facilitated.

Further, the near-infrared sensor 30, to which the lateral brackets 35 and the vertical brackets 45 are attached, can be taken out from the front grille 10 by unfastening the attaching portions 38 and the attaching portions 48 respectively from the second bosses 23 and the second bosses 24. Also, the near-infrared sensor 30 can be indirectly attached to the front grille 10 with the lateral brackets 35 and the vertical brackets 45 by fastening the attaching portions 38 and the attaching portions 48 respectively to the second bosses 23 and the second bosses 24.

In addition to the ones listed above, the first embodiment has the following advantages.

If the near-infrared sensor 30 were attached to a part other than the front grille 10, for example, to the vehicle body, it would be difficult to accurately arrange the near-infrared sensor 30 in a position that has a specific positional relationship with the sensor cover 55 attached to the front grille 10. This is because the near-infrared sensor 30 and the sensor cover 55 would be attached to different components.

Also, when vibrations are transmitted to the near-infrared sensor 30 and the sensor cover 55 from the vehicle, the intensities of vibrations may be different between the near-infrared sensor 30 and the sensor cover 55 due to different transmission paths of vibrations.

The positional displacement and the difference in the intensities of vibrations may reduce the transmissiveness to near-infrared rays of the sensor cover 55 and the sensing performance of the near-infrared sensor 30.

In this respect, like the sensor cover 55, the near-infrared sensor 30 is attached to the front grille 10 in the first embodiment. In other words, the near-infrared sensor 30 and the sensor cover 55 are both attached to the front grille 10. This allows the near-infrared sensor 30 to be arranged at a position that has a specific positional relationship with the sensor cover 55.

Also, the near-infrared sensor 30 and the sensor cover 55 both receive vibrations through the front grille 10. The near-infrared sensor 30 and the sensor cover 55 vibrate to degrees similar to each other. The positional displacement and the difference in the intensities of vibrations of the sensor cover 55 and the near-infrared sensor 30 are therefore reduced, so that the transmissiveness to near-infrared rays of the sensor cover 55 and the sensing performance of the near-infrared sensor 30 are maintained.

In the first embodiment, the lateral brackets 35 and the vertical brackets 45 are used to indirectly attach the near-infrared sensor 30 to the front grille 10. This increases the degree of flexibility in the position to which the near-infrared sensor 30 is attached as compared to a case in which the near-infrared sensor 30 is directly attached to the front grille 10 without using the lateral brackets 35 or the vertical brackets 45.

Also, the near-infrared sensor 30 does not need to be machined to form second fastening portions (second fastening holes 43, 49) so that the near-infrared sensor 30 can be attached to the front grille 10.

Particularly, in the first embodiment, the second support portions (second bosses 23, 24) in the front grille 10 are located at positions far from the near-infrared sensor 30. Even in this case, the use of the lateral brackets 35 and the vertical brackets 45 provides the second fastening portions (second fastening holes 43, 49) that can be fastened to the second support portions. This allows the near-infrared sensor 30 to be properly attached to the front grille 10.

Second Embodiment

Figure 8:
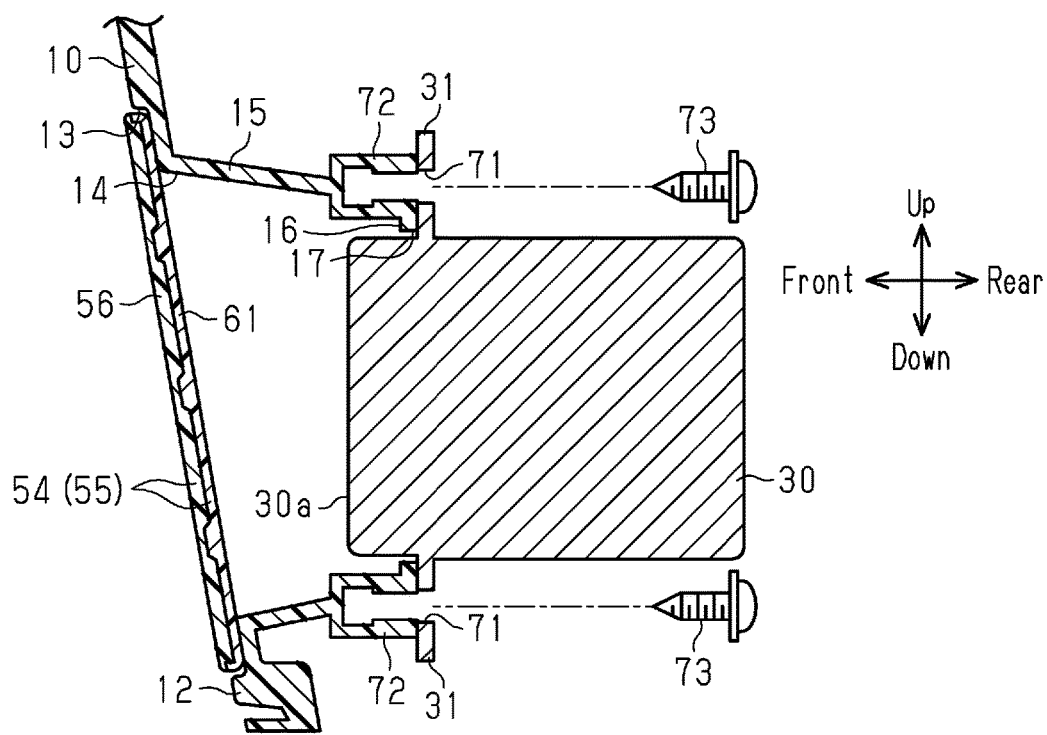
FIG. 8 is a partial cross-sectional view corresponding to FIG. 3, showing a second embodiment.

A second embodiment will now be described with reference to FIG. 8.

The second embodiment does not use the lateral brackets 35 or the vertical brackets 45, and attach the near-infrared sensor 30 directly to the front grille 10.

More specifically, the tubular wall portion 15 includes second bosses 72, which serve as the second support portions, at a rear end portion 16 around the attaching hole 17. The second bosses 72 extend in the front-rear direction and are located at positions spaced apart from each other in the circumferential direction of the attaching hole 17. The second bosses 72 are located at positions rearward of the opening 14 and displaced from the first fastening holes 19 (see FIG. 6) in the circumferential direction of the opening 14.

Also, the flange 31 of the near-infrared sensor 30 has second fastening holes 71 at positions rearward of the second bosses 72. The second fastening holes 71 and parts of the flange 31 that surround the second fastening holes 71 form the second fastening portions.

Second screws 73 are inserted into the second fastening holes 71 from the rear side and threaded into the second bosses 72. This fastens the parts of the flange 31 that surround the second fastening holes 71 to the corresponding second bosses 72, while allowing parts to be unfastened.

The configuration, other than the above, is the same as the first embodiment. Thus, the same components as those in the first embodiment are given the same reference numerals, and detailed explanations are omitted.

Thus, in the second embodiment, when the sensing performance of the near-infrared sensor 30 is reduced, the second screws 73 are rotated to be loosened and removed from the second bosses 72 and the second fastening holes 71. Accordingly, the parts of the flange 31 that surround the second fastening holes 71 are unfastened from the second bosses 72. The near-infrared sensor 30 is taken out rearward from the attaching hole 17 of the tubular wall portion 15, so as to be removed from the front grille 10.

Subsequently, another near-infrared sensor 30, of which the sensing performance has not been reduced, is brought closer to the front grille 10 from the rear side, and the part of the near-infrared sensor 30 that is forward of the flange 31 is inserted into the attaching hole 17. The flange 31 is brought close to or in contact with the second bosses 72. The second screws 73 are inserted into the second fastening holes 71 from the rear side, and are rotated to be tightened. This rotation causes the second screws 73 to be threaded into the second bosses 72, so that the parts of the flange 31 that surround the second fastening holes 71 are fastened to the second bosses 72. This fastening operation directly attaches the near-infrared sensor 30 to the front grille 10. The near-infrared sensor 30 is replaced in this manner.

The second embodiment thus achieves the same operations and advantages as the first embodiment.

Additionally, the second embodiment is capable of attaching the near-infrared sensor 30 to the front grille 10 with a fewer number of components since the lateral brackets 35 and the vertical brackets 45 are not used.

Third Embodiment

A third embodiment will now be described with reference to FIGS. 9 and 10.

If water collects on the outer surface of the near-infrared sensor, through which near-infrared rays are received or transmitted, the sensing performance is influenced and may be reduced.

Figure 9:
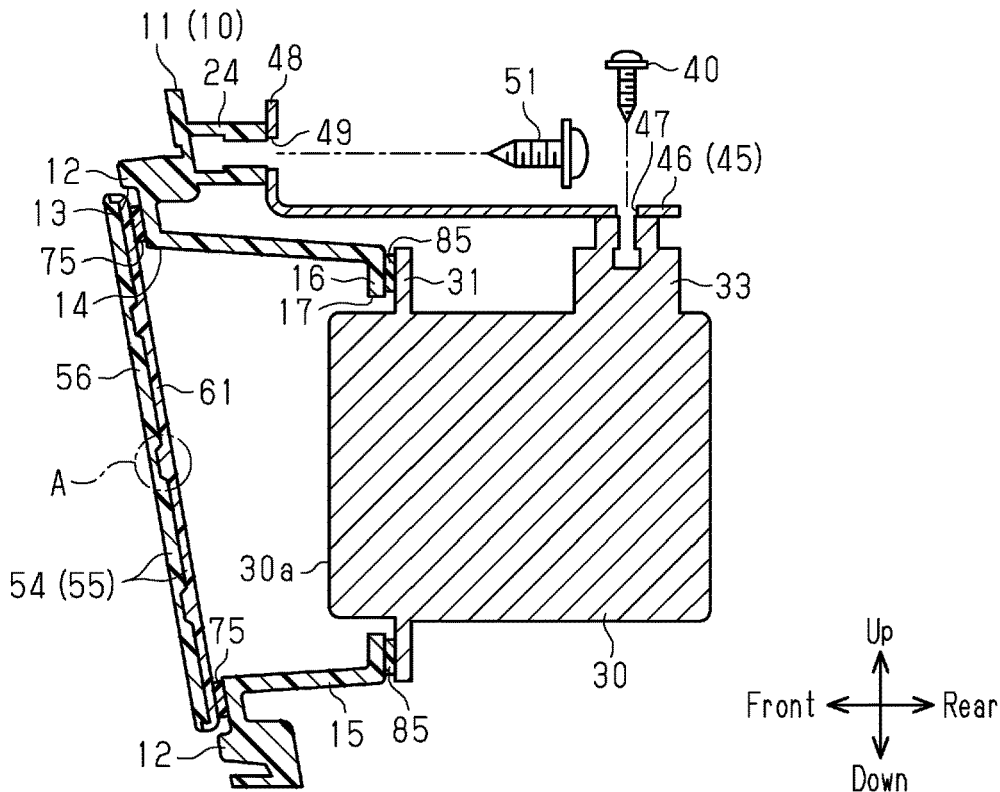
FIG. 9 is a partial cross-sectional view corresponding to FIG. 3, showing a third embodiment.
Figure 10:
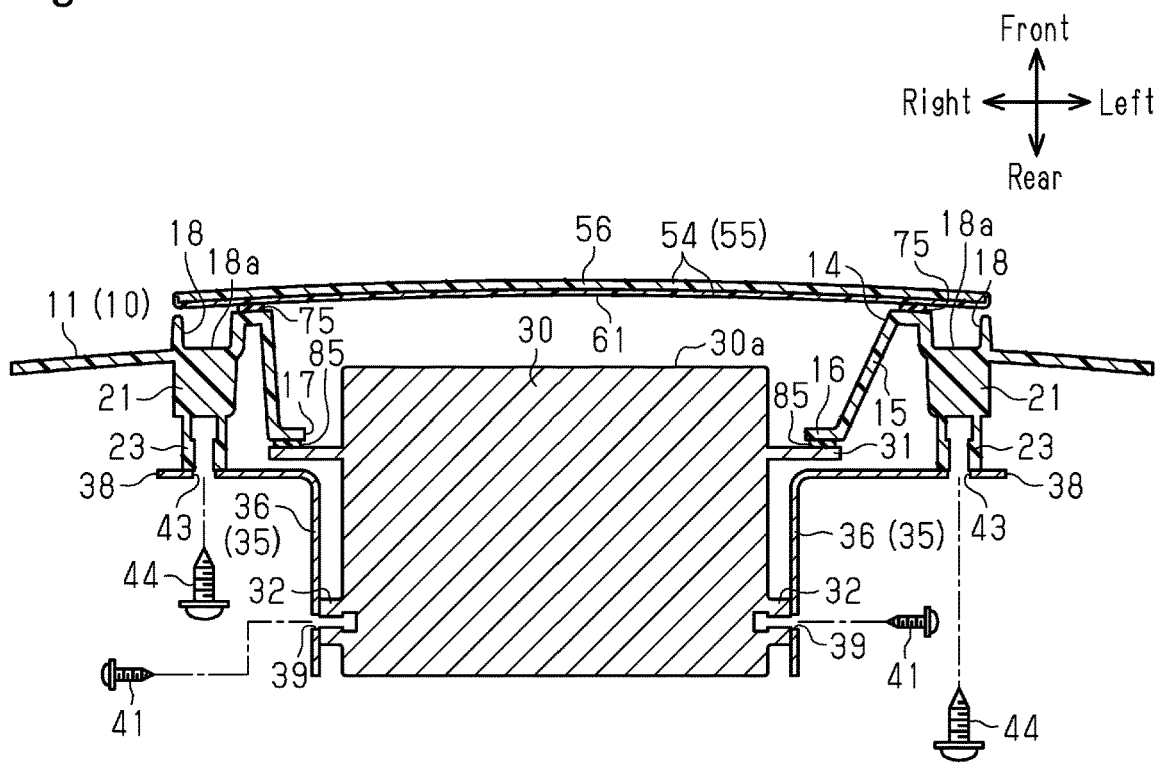
FIG. 10 is a cross-sectional view corresponding to FIG. 7, showing the third embodiment.

In this respect, as shown in FIGS. 9 and 10, the third embodiment includes a first seal portion 75 and a second seal portion 85, which restrict water from collecting on the outer surface of the near-infrared sensor 30, that is, the front end face 30a. The first seal portion 75 and the second seal portion 85 are annular and made of an elastic material. The elastic material may be a rubber such as ethylene propylene diene (EPDM) rubber. The elastic material may be a plastic such as a flexible urethane, which has a rubber elasticity. The elastic material may be a soft foam such as sponge having closed cells. The first seal portion 75 and the second seal portion 85 may each have a structure without spaces inside (solid structure), or a structure with spaces inside (hollow structure).

The first seal portion 75 is a component separate from the sensor cover 55 and the front grille 10. The first seal portion 75 is arranged between the sensor cover 55 and the front grille 10 at a position surrounding the opening 14. In the present embodiment, the first seal portion 75 is arranged between the rear surface of a part of the sensor cover 55 that is outward of the transmissive portion 54 and a section of the front surface of the step portion 13 of the front grille 10 that is outward of and adjacent to the peripheral portion of the opening 14. Further, the first seal portion 75 is arranged closer to the opening 14 than the recesses 18. Accordingly, the first seal portion 75 is located between the opening 14 and parts of the first bosses 68 that are fastened to the first fastening holes 19.

In the present embodiment, the first seal portion 75 is fixed to the sensor cover 55 by a fixing means such as vulcanized adhesion, adhesion using an adhesive, adhesion using a pressure sensitive adhesive. The first seal portion 75 is pressed against the front surface of the step portion 13, while being elastically deformed by fastening of the first screws 69.

The second seal portion 85 is a component separate from the front grille 10 and the near-infrared sensor 30. The second seal portion 85 is arranged between the rear surface of the end portion 16 of the tubular wall portion 15 and the front surface of the flange 31 of the near-infrared sensor 30. The second seal portion 85 is pressed against the rear surface of the end portion 16 and the front surface of the flange 31, while being elastically deformed by fastening of the second screws 44, 51.

The configuration, other than the above, is the same as the first embodiment. Thus, the same components as those in the first embodiment are given the same reference numerals, and detailed explanations are omitted.

The third embodiment achieves the same operations and advantages as the first embodiment.

As shown in FIGS. 9 and 10, when it is raining, water may enter the space rearward of the opening 14 from the space forward of the opening 14 through the gap between the sensor cover 55 and the front grille 10. The entered water may collect on the front end face 30a of the near-infrared sensor 30.

In this respect, the annular first seal portion 75 is arranged between the sensor cover 55 and the front grille 10 at a position surrounding the opening 14 in the present embodiment. The first seal portion 75 prevents water from entering the space rearward of the opening 14 from the space forward of the opening 14 through the gap between the sensor cover 55 and the front grille 10. Water is therefore unlikely to collect on the front end face 30a of the near-infrared sensor 30, which is located rearward of the opening 14.

Further, the first seal portion 75 is arranged between the opening 14 and the parts of the first bosses 68 that are fastened to the first fastening holes 19 in the present embodiment. Thus, even if entry of water occurs at the above-described fastened locations, the first seal portion 75 restricts the water from entering the space rearward of the opening 14. Water is therefore further unlikely to collect on the front end face 30a.

Also, in the present embodiment, the part of the near-infrared sensor 30 that is inserted into the attaching hole 17 and is located inside the tubular wall portion 15, that is, the part of the near-infrared sensor 30 that is forward of the flange 31, is surrounded by the tubular wall portion 15. The front end face 30a is located inside the tubular wall portion 15. This restricts water in the space rearward of the opening 14 from entering the tubular wall portion 15 when it is raining. Water is therefore further unlikely to collect on the front end face 30a.

Also, when it is raining, water may enter the interior of the tubular wall portion 15 through the gap between the near-infrared sensor 30 and the tubular wall portion 15. The entered water may collect on the front end face 30a of the near-infrared sensor 30.

In this respect, the second seal portion 85, which surrounds the attaching hole 17, is arranged between the end portion 16 on the projecting side (rear side) of the tubular wall portion 15 and the flange 31 of the near-infrared sensor 30 in the present embodiment. Thus, the second seal portion 85 restricts the water in the space rearward of the opening 14 from entering the interior of the tubular wall portion 15 from the attaching hole 17 through the gap between the end portion 16 and the flange 31. Water is therefore further unlikely to collect on the front end face 30a of the near-infrared sensor 30.

Further, in the present embodiment, the first seal portion 75 is fixed to and integrated with the sensor cover 55. Thus, when the sensor cover 55 is detached from or attached to the front grille 10, the first seal portion 75 is detached or attached to the front grille 10 together with the sensor cover 55.

More specifically, when the sensor cover 55 is detached from the front grille 10, the first screws 69 are rotated to be loosened and removed from the first bosses 68 and the first fastening holes 19 as in the first embodiment. This unfastens the first bosses 68 from the inner bottom portions 18a of the recesses 18, allowing the sensor cover 55 to be detached forward from the front grille 10 together with the first seal portion 75.

When another sensor cover 55 is attached to the front grille 10, the sensor cover 55 is brought closer to the front grille 10 from the front, as in the first embodiment. Accordingly, the first seal portion 75 approaches a part of the step portion 13 that surrounds the opening 14. Also, each first boss 68 is inserted into the corresponding recess 18. The first screws 69 are inserted into the first fastening holes 19 from the rear side, and are rotated to be tightened. This rotation causes the first screws 69 to be threaded into the first bosses 68, so that the first bosses 68 are fastened to the inner bottom portions 18a. The sensor cover 55 is thus attached to the front grille 10 together with the first seal portion 75. At this time, the first seal portion 75 is elastically deformed and pressed against the step portion 13. The sensor cover 55 is replaced together with the first seal portion 75 in this manner.

Therefore, when the sealing performance of the first seal portion 75 is reduced, the first seal portion 75 can be replaced by replacing the sensor cover 55. The sealing performance is thus ensured.

The above-described embodiments may be modified as follows.

<Common Modifications of First to Third Embodiments>

The sensor cover 55 and the near-infrared sensor 30 may be attached to the front grille 10 by a fastening method other than screw fastening, for example, by a fastening method using clips, screws, or hooks.

The above-described mounting structures may be employed in a vehicle equipped with a near-infrared sensor that transmits near-infrared rays in a direction other than the forward direction. Specifically, the mounting structure may be employed in a near-infrared sensor that is used to monitor the situation on the side of the front part of the vehicle, the situation behind the vehicle, or the situation on the side of the rear part of the vehicle.

In the case of a near-infrared sensor used to monitor the situation on the side of the front part of the vehicle, a bumper cover of the front bumper is used as the exterior component. The near-infrared sensor is arranged on the inner side of each of openings on the sides in the left-right direction of the bumper cover. This type of near-infrared sensor is used in a system that lessens the impact of a collision with another vehicle that approaches from diagonally forward in an intersection with good visibility or the impact of a collision with an oncoming vehicle that crosses the center line. This type of near-infrared sensor has a role in detecting an object on the side of or diagonally forward of the vehicle.

In the case of a near-infrared sensor used to monitor the situation behind the vehicle, a bumper cover of the rear bumper is used as the exterior component. The near-infrared sensor is arranged on the inner side of an opening at the center in the left-right direction of the bumper cover. This type of near-infrared sensor has a role in detecting a vehicle approaching from behind during traveling at a predetermined speed or higher.

In the case of a near-infrared sensor used to monitor the situation on the side of the rear part of the vehicle, a bumper cover of the rear bumper is used as the exterior component. The near-infrared sensor is arranged on the inner side of each of openings on the sides in the left-right direction of the bumper cover. This type of near-infrared sensor has a role in detecting a vehicle diagonally rearward, which tends to be a blind spot of the driver, or a vehicle approaching from diagonally rearward during backing.

The above-described near-infrared sensor used to monitor the situation on the side of the front part of the vehicle and the near-infrared sensor used to monitor the situation on the side of the rear part of the vehicle may be arranged on each of the opposite sides in the left-right direction of the vehicle. Alternatively, these near-infrared sensors may be arranged only on one side.

<Common Modifications of First and Third Embodiments>

Brackets of a number greater than or less than those in the first and third embodiments may be used, and the near-infrared sensor 30 may be indirectly attached to the front grille 10 with those brackets.

<Modifications of Third Embodiment>

The near-infrared sensor 30 may be directly attached to the front grille 10 without using brackets.

Figure 11A:
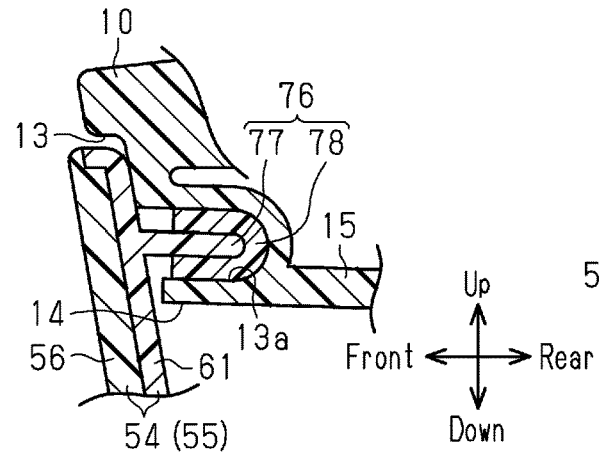
FIG. 11A is a partial cross-sectional view showing a state in which a first seal portion of a modification performs sealing.
Figure 11B:
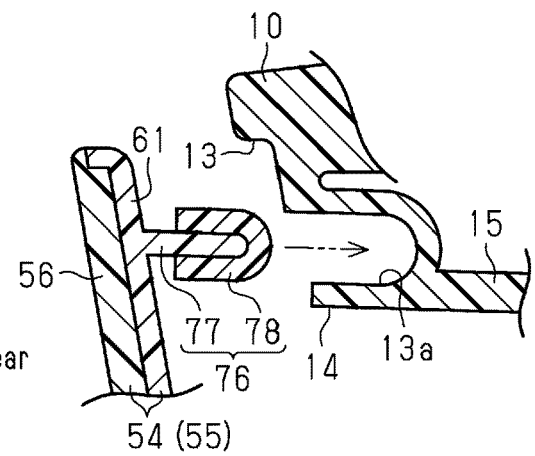
FIG. 11B is a partial cross-sectional view showing a state before sealing is performed in the modification of FIG. 11A.

As shown in FIGS. 11A and 11B, the step portion 13 may have an annular recess 13a, which is located around the opening 14 and recessed rearward. A first seal portion 76 may be fitted in the annular recess 13a. The first seal portion 76 includes an annular projection 77 and a seal body 78. The annular projection 77 projects rearward from the rear surface of the periphery of the inner base 61, and is made of a hard plastic like the inner base 61. The seal body 78 is formed by applying, to the annular projection 77, a soft sealing material such as a urethane sealing material, and curing the applied sealing material. The seal body 78 may include a plate made of an elastic material, and may be fixed to the annular projection 77 with an adhesive or a pressure sensitive adhesive, while being curved into a U-shape along the annular projection 77.

When the sensor cover 55 is attached to the front grille 10, the seal body 78 is inserted into the annular recess 13a as indicated by the arrow of the long-dash double-short-dash line in FIG. 11B. As shown in FIG. 11A, the annular projection 77 is also inserted into the annular recess 13a. The first seal portion 76 contacts the outer surface of the annular projection 77 and the inner wall surface of the annular recess 13a at the seal body 78, so as to restrict water from entering the space rearward of the opening 14.

Although not illustrated, the above-described modification can be applied to the second seal portion 85.

Figure 12:
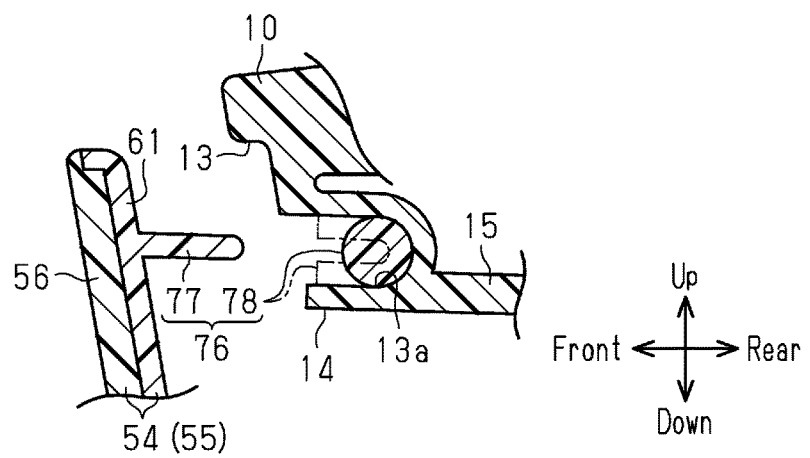
FIG. 12 is a partial cross-sectional view of a first seal portion of a modification, showing a state before the first seal portion performs sealing.

Unlike the modification of FIGS. 11A and 11B, the seal body 78 may be separated from the annular projection 77 as shown in FIG. 12. In this case, the annular seal body 78, which, for example, has a circular cross-sectional shape, is inserted into and arranged in the annular recess 13a before the sensor cover 55 is attached to the front grille 10. This modification is the same as that of FIGS. 11A and 11B in that the inner base 61 has the annular projection 77.

When the sensor cover 55 is attached to the front grille 10, the transmissive portion 54 is brought closer to the step portion 13, so that the annular projection 77 is inserted into the annular recess 13a and into the seal body 78. This insertion elastically deforms the seal body 78 so that the seal body 78 has a U-shaped cross section as indicated by the long-dash double-short-dash line in FIG. 12. When the sensor cover 55 is attached to the front grille 10, the first seal portion 76 is in the same state as that in FIG. 11A.

Although not illustrated, the above-described modification can be applied to the second seal portion 85.

Figure 13A:
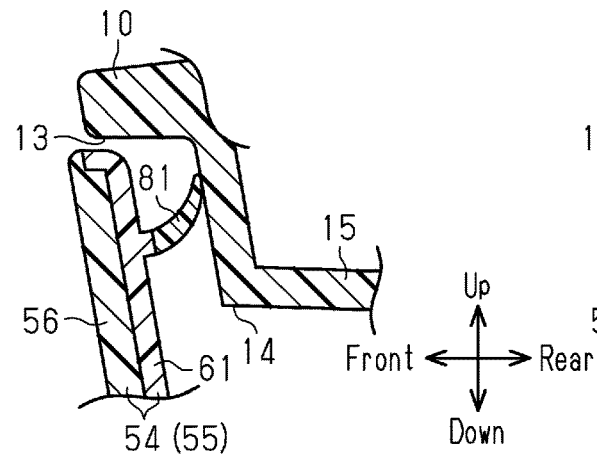
FIGS. 13A and 13B are partial cross-sectional views each showing a first seal portion according to a modification.

FIG. 13A illustrates a modification in which a portion that corresponds to the annular projection 77 in FIGS. 11A and 11B and FIG. 12 may be made of a soft plastic, and include an annular first seal portion 81. In this case, when the sensor cover 55 is attached to the front grille 10, the first seal portion 81 is elastically deformed in the thickness direction and pressed against the step portion 13.

The first seal portion 81 may be made of a plastic that is softer than that of the inner base 61, and formed integrally with the inner base 61 by the two-color molding. The first seal portion 81 and the inner base 61 may be formed separately and fixed to each other using an adhesive or a pressure sensitive adhesive.

Although not illustrated, the above-described modification can be applied to the second seal portion 85.

Figure 13B:
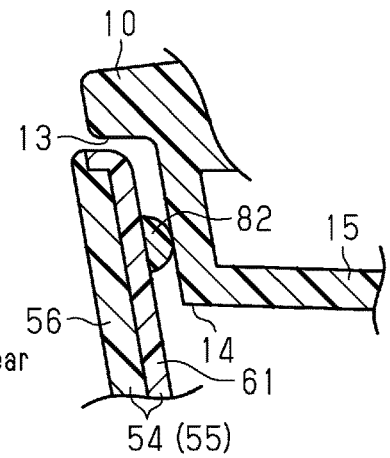

A first seal portion 82 that has a cross-sectional shape different from that in FIG. 13A may be used. FIG. 13B shows one example, which uses a first seal portion 82 having a semicircular cross-sectional shape. In addition, a first seal portion 82 that has a cross-sectional shape other than a semicircular shape may be used.

Although not illustrated, the above-described modification can be applied to the second seal portion 85.

The first seal portion 75 may be fixed to the step portion 13 of the front grille 10, instead of the sensor cover 55. Alternatively, the first seal portion 75 does not necessarily need to be fixed to the sensor cover 55 or to the front grille 10.

The second seal portion 85 may be fixed to one of the end portion 16 of the tubular wall portion 15 or the flange 31 of the near-infrared sensor 30. Alternatively, the second seal portion 85 does not necessarily need to be fixed to the end portion 16 or the flange 31.

The second seal portion 85 may be omitted, and the sealing of the near-infrared sensor 30 may be provided by the first seal portion 75 alone.

The front surface 57 of the outer base 56 of the transmissive portion 54 may be subjected to water repellent finishing, so that the transmissive portion 54 has a function of removing water droplets.

DESCRIPTION OF THE REFERENCE NUMERALS

10 . . . Front Grille (Exterior Component); 14 . . . Opening; 15 . . . Tubular Wall Portion; 16 . . . End Portion; 17 . . . Attaching Hole; 19 . . . First Fastening Holes (Part of First Support Portion); 23, 24, 72 . . . Second Bosses (Part of Second Support Portions); 30 . . . Near-Infrared Sensor; 31 . . . Flange; 35 . . . Lateral Brackets (Part of Brackets); 43, 49, 71 . . . Second Fastening Holes (Part of Second Fastening Portions); 44, 51, 73 . . . Second Screw; 45 . . . Vertical Brackets (Part of Brackets); 54 . . . Transmissive Portion; 55 . . . Sensor Cover; 68 . . . First Bosses (Part of First Fastening Portions); 69 . . . First Screws; 75, 76, 81, 82 . . . First Seal Portions; 85 . . . Second Seal Portion

The invention claimed is:

1. A structure for mounting a near-infrared sensor and a sensor cover to a vehicle, the structure adapted to a vehicle, wherein
the vehicle includes
the near-infrared sensor, which is configured to transmit near-infrared rays to outside of the vehicle and receive the near-infrared rays that have struck and been reflected by an object outside the vehicle,
an exterior component that has an opening that is located forward of the near-infrared sensor in a transmission direction of near-infrared rays, and
the sensor cover, which includes a transmissive portion having transmissiveness to near-infrared rays and covers the near-infrared sensor from an outer side,
the near-infrared sensor is located at an installation position that is set on an inner side of the opening,
a first fastening portion is provided on a surface on an inner side of the sensor cover,
a first support portion is provided around the opening of the exterior component,
the first fastening portion is fastened to the first support portion, with the first fastening portion being allowed to be unfastened from the first support portion,
the exterior component includes a tubular wall portion that projects toward the inner side from a peripheral edge of the opening,
the tubular wall portion includes an attaching hole that is formed at an end portion on the inner side of the tubular wall portion,
at the installation position, part of the near-infrared sensor is arranged inside the tubular wall portion through the attaching hole of the tubular wall portion,
the near-infrared sensor includes a second fastening portion,
the exterior component includes a second support portion on or outside the tubular wall portion, and
the second fastening portion is fastened to the second support portion, with the second fastening portion being allowed to be unfastened from the second support portion.

2. The structure for mounting the near-infrared sensor and the sensor cover to the vehicle according to claim 1, wherein
the transmissive portion is arranged on the outer side of the opening,
the near-infrared sensor includes a flange at an outer periphery of the near-infrared sensor,
the flange allows the near-infrared sensor to be inserted to the installation position from the inner side through the attaching hole, and
the flange restricts the near-infrared sensor from being inserted to the installation position from the outer side through the attaching hole.

3. The structure for mounting the near-infrared sensor and the sensor cover to the vehicle according to claim 2, wherein
the first support portion and the second support portion are provided on the inner side of the opening, and the second support portion is displaced from the first support portion in a circumferential direction of the opening.

4. The structure for mounting the near-infrared sensor and the sensor cover to the vehicle according to claim 1, wherein
a bracket is attached to the near-infrared sensor, the bracket being located on the inner side of the opening and outside the tubular wall portion,
the second fastening portion is arranged in the bracket, and
the second support portion is located on the inner side of the opening and outside the tubular wall portion.

5. The structure for mounting the near-infrared sensor and the sensor cover to the vehicle according to claim 2, wherein
part of the near-infrared sensor that is on the outer side of the flange is arranged inside the tubular wall portion through the attaching hole,
the second fastening portion is provided in the flange, and
the second support portion is provided in part of the end portion of the tubular wall portion that surrounds the attaching hole.

6. The structure for mounting the near-infrared sensor and the sensor cover to the vehicle according to claim 1, wherein
the first support portion includes a first fastening hole that is formed in part of the exterior component that is on the inner side of the first fastening portion, and
a first screw is threaded into the first fastening portion through the first fastening hole.

7. The structure for mounting the near-infrared sensor and the sensor cover to the vehicle according to claim 4, wherein
the second fastening portion includes a second fastening hole that is formed in part of the bracket that is on the inner side of the second support portion, and
a second screw is threaded into the second support portion through the second fastening hole.

8. The structure for mounting the near-infrared sensor and the sensor cover to the vehicle according to claim 5, wherein
the second fastening portion includes a second fastening hole that is formed in part of the flange that is on the inner side of the second support portion, and
a second screw is threaded into the second support portion through the second fastening hole.

9. The structure for mounting the near-infrared sensor and the sensor cover to the vehicle according to claim 1, wherein
the transmissive portion is arranged on the outer side of the opening, and
an annular seal portion is arranged between the sensor cover and the exterior component at a position surrounding the opening.

10. The structure for mounting the near-infrared sensor and the sensor cover to the vehicle according to claim 9, wherein the seal portion is fixed to the sensor cover.

11. The structure for mounting the near-infrared sensor and the sensor cover to the vehicle according to claim 9, wherein the seal portion is arranged between the opening and a section of the first fastening portion that is fastened to the first support portion.

12. The structure for mounting the near-infrared sensor and the sensor cover to the vehicle according to claim 9, wherein
the near-infrared sensor includes a flange at an outer periphery, and
at the installation position, part of the near-infrared sensor that is on the outer side of the flange is inserted into the attaching hole to be arranged inside the tubular wall portion.

13. The structure for mounting the near-infrared sensor and the sensor cover to the vehicle according to claim 12, wherein
the seal portion is a first seal portion, and
an annular second seal portion is arranged between the end portion of the tubular wall portion and the flange of the near-infrared sensor.

\* \* \* \* \*